(12) United States Patent
Srinivasan

(10) Patent No.: US 8,671,204 B2
(45) Date of Patent: Mar. 11, 2014

(54) COOPERATIVE SHARING OF SUBSCRIPTIONS TO A SUBSCRIBER-BASED NETWORK AMONG M2M DEVICES

(75) Inventor: Prasanna Srinivasan, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 84 days.

(21) Appl. No.: 13/172,730

(22) Filed: Jun. 29, 2011

(65) Prior Publication Data

US 2013/0007278 A1    Jan. 3, 2013

(51) Int. Cl.
*G06F 15/16* (2006.01)

(52) U.S. Cl.
USPC .......................................... 709/228

(58) Field of Classification Search
USPC ............................ 709/226, 208; 710/200, 244
See application file for complete search history.

(56) References Cited

U.S. PATENT DOCUMENTS

| | | | |
|---|---|---|---|
| 5,657,373 A * | 8/1997 | Hermansson et al. ...... | 455/435.2 |
| 6,115,607 A * | 9/2000 | Holcman ................... | 455/435.3 |
| 6,449,483 B1 * | 9/2002 | Akhteruzzaman et al. ... | 455/445 |
| 7,028,300 B2 * | 4/2006 | Goldick ........................ | 718/104 |
| 7,113,765 B2 * | 9/2006 | Minear et al. ................. | 455/405 |
| 7,603,109 B2 * | 10/2009 | Barone et al. ............. | 455/414.1 |
| 7,818,296 B2 | 10/2010 | Holt | |
| 2002/0004745 A1* | 1/2002 | Bascobert et al. .............. | 705/14 |
| 2004/0047332 A1* | 3/2004 | Bensimon et al. ............ | 370/347 |
| 2007/0129079 A1* | 6/2007 | Schwarz et al. .............. | 455/450 |
| 2008/0144578 A1* | 6/2008 | Kaal ............................. | 370/331 |
| 2009/0191857 A1 | 7/2009 | Horn | |
| 2009/0217348 A1 | 8/2009 | Salmela | |
| 2009/0217364 A1 | 8/2009 | Salmela | |
| 2010/0095005 A1* | 4/2010 | Le Lann et al. ............... | 709/226 |
| 2010/0149583 A1 | 6/2010 | Tian | |
| 2010/0279655 A1 | 11/2010 | Larsson | |
| 2010/0311402 A1 | 12/2010 | Srinivasan | |
| 2011/0010453 A1* | 1/2011 | Roy .............................. | 709/225 |
| 2012/0023554 A1* | 1/2012 | Murgia et al. ..................... | 726/4 |

OTHER PUBLICATIONS

3GPP TR 22.868 V8.0.0 (Mar. 2007) pp. 9-10.
"3rd Generation Partnership Project; Technical Specification Group Services and System Aspects; System Improvements for Machine-Type Communications; (Release 10)", 3GPP Standard; 3GPP TR 23.888, 3rd Generation Partnership Project (3GPP), Mobile Competence Centre ; 650, Route Des Lucioles ; F-06921 Sophia-Antipolis Cedex ; France, No. Vo.5.1, Jul. 20, 2010, pp. 1-75, XP050442014, [retrieved on Jul. 20, 2010].
International Search Report and Written Opinion—PCT/US2012/045132—ISA/EPO—Nov. 7, 2012.

* cited by examiner

*Primary Examiner* — Lance L Barry
(74) *Attorney, Agent, or Firm* — Abdollah Katbab

(57) ABSTRACT

Apparatus and methods for managing access to a subscriber-based network by a plurality of machine-to-machine (M2M) devices include mechanisms for determining a first set of one or more subscriptions to a subscriber-based network that are provisioned on a first device, mechanisms for determining a selected subscription that is available to use from the first set of one or more subscriptions provisioned in the first device, and mechanisms for enabling the first device to use the selected subscription.

22 Claims, 5 Drawing Sheets

COOPERATIVE SHARING OF SUBSCRIPTIONS TO A SUBSCRIBER-BASED NETWORK AMONG M2M DEVICES

BACKGROUND

The described aspects relate to mobile wireless communications, and more particularly, to apparatus and methods of connection establishment in a communications network.

Mobile wireless communications involve an access terminal (AT) interacting with a communications network to originate or receive a call. A call originated by an AT is referred to as a mobile originated call, while a call received by the AT is referred to as a mobile terminated call.

In order to make or receive a call, a connection needs to be established between the AT and a communications network. In establishing such a connection, an AT context is created at the various entities involved in a path that defines the connection between the AT and the communications network. For example, the connection path may include, at least, the AT, a radio access network component, a packet data serving node (PDSN) or gateway component, and one or more core Internet Protocol (IP) network components, such as a mobility component. When a call is made, the connection path may further include another communication device, e.g. the call originator or call receiver. The type of connection between each of these entities may vary, and as such, there may be a separate, AT-specific context corresponding to each of the connections in the path. Each separate, AT-specific context may also be referred to as a per-AT context. Each AT-specific context comprises various parameters that define attributes and/or characteristics, e.g. associated with a respective protocol layer, supporting a respective one or more portions of the connection path.

Currently, when an access terminal is powered on, a connection is established and each of the connecting entities in the connection path maintains, until the AT is powered down, a per-AT context for the AT for the connection. Even when a call is not in process, the connecting entities reserve the resources for the connection. For example, in order to receive a call, e.g. a mobile terminated call, the current architecture and protocols require that the connection is setup between the AT and the communications network.

This model is justifiable when calls occur frequently, e.g. when an inter-data-arrival time is small. When calls occur infrequently, however, this kind of model involving the reserving a per-AT context and/or resource at the network is very expensive. For example, the flexible architecture and inherent mobility of cellular communication can be leveraged by deploying a number of devices, e.g., Machine-to-Machine (M2M) devices that need to infrequently give reports, e.g., meter readings, status data, etc. Even if these M2M devices infrequently power up an AT for cellular communication, it can also be economically inefficient to provision each M2M device with a unique subscription.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the present disclosure provides a method for managing access to a subscriber-based network by a plurality of machine-to-machine (M2M) devices by determining a first set of one or more subscriptions to a subscriber-based network that are provisioned on a first device, determining a selected subscription that is available to use from the first set of one or more subscriptions provisioned in the first device, and enabling the first device to the use the selected subscription.

In another aspect, the present disclosure provides at least one processor for managing access to a subscriber-based network by a plurality of M2M devices. A first module determines a first set of one or more subscriptions to a subscriber-based network that are provisioned on a first device. A second module determines a selected subscription that is available to use from the first set of one or more subscriptions provisioned in the first device. A third module enables the first device to the use the selected subscription.

In an additional aspect, the present disclosure provides a computer program product for managing access to a subscriber-based network by a plurality of M2M devices. A non-transitory computer-readable storage medium stores sets of code. A first set of code causes a computer to determine a first set of one or more subscriptions to a subscriber-based network that are provisioned on a first device. A second set of code causes the computer to determine a selected subscription that is available to use from the first set of one or more subscriptions provisioned in the first device. A third set of code causes the computer to enable the first device to the use the selected subscription.

In a further aspect, the present disclosure provides an apparatus for managing access to a subscriber-based network by a plurality of M2M devices. The apparatus comprises means for determining a first set of one or more subscriptions to a subscriber-based network that are provisioned on a first device. The apparatus comprises means for determining a selected subscription that is available to use from the first set of one or more subscriptions provisioned in the first device. The apparatus comprises means for enabling the first device to use the selected subscription.

In yet another aspect, the present disclosure provides an apparatus for managing access to a subscriber-based network by a plurality of M2M devices. A communication component communicates with a first device. A subscription manager, which is coupled to the communication component, determines a first set of one or more subscriptions to a subscriber-based network that are provisioned on a first device, determines a selected subscription that is available to use from the first set of one or more subscriptions provisioned in the first device, and enables the first device to use the selected subscription.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

A subscription Controlling Server (CS) that shares a common resource with end terminals (e.g., M2M devices) coordinates and performs subscription handling. The CS instructs a M2M device to use a particular subscription (e.g., based on International Mobile Subscriber Information (IMSI) or some unique identity) to camp onto a network. This particular subscription is used to initiate a data connection by the M2M device. The CS can also instruct the M2M device to relinquish a particular subscription so that it can be used by other M2M devices. The CS can lock a subscription per M2M device at any point in time so that the same subscription is not used by two M2M devices at the same time. When an M2M device relinquishes a subscription, the M2M device informs the CS, which unlocks the subscription so that the subscription could be used by other M2M devices if required. This locking mechanism enables multiple shared subscriptions on a M2M device without each M2M device by itself knowing which subscription is free to use.

Thereby, the present innovation contemplates and improves upon another solution in which a common resource is used to wake up an M2M device so that the M2M device can use an Access Terminal (AT) present in the M2M device for initiating a data session. With the wake up method, the M2M device can connect using any available subscription, which would most likely be only one subscription provisioned on the M2M device. This situation results in a limitation that availability of a free subscription would be scarce if the shared single subscription is pre-provisioned on many M2M devices. Thus, in the wake up method the shared subscription should instead be limited to a minimal set of M2M devices to increase availability; however, this constraint would result in each subscription having reduced utility.

With better distribution of subsets of subscriptions and controlling/locking of subscriptions, a number and utilization of subscriptions can be optimized. In particular, the number of subscriptions can be reduced without impairing access to a data connection. In addition, the distribution of subscriptions can reflect realistic limitations in the number of subscriptions that each device can be provisioned with.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
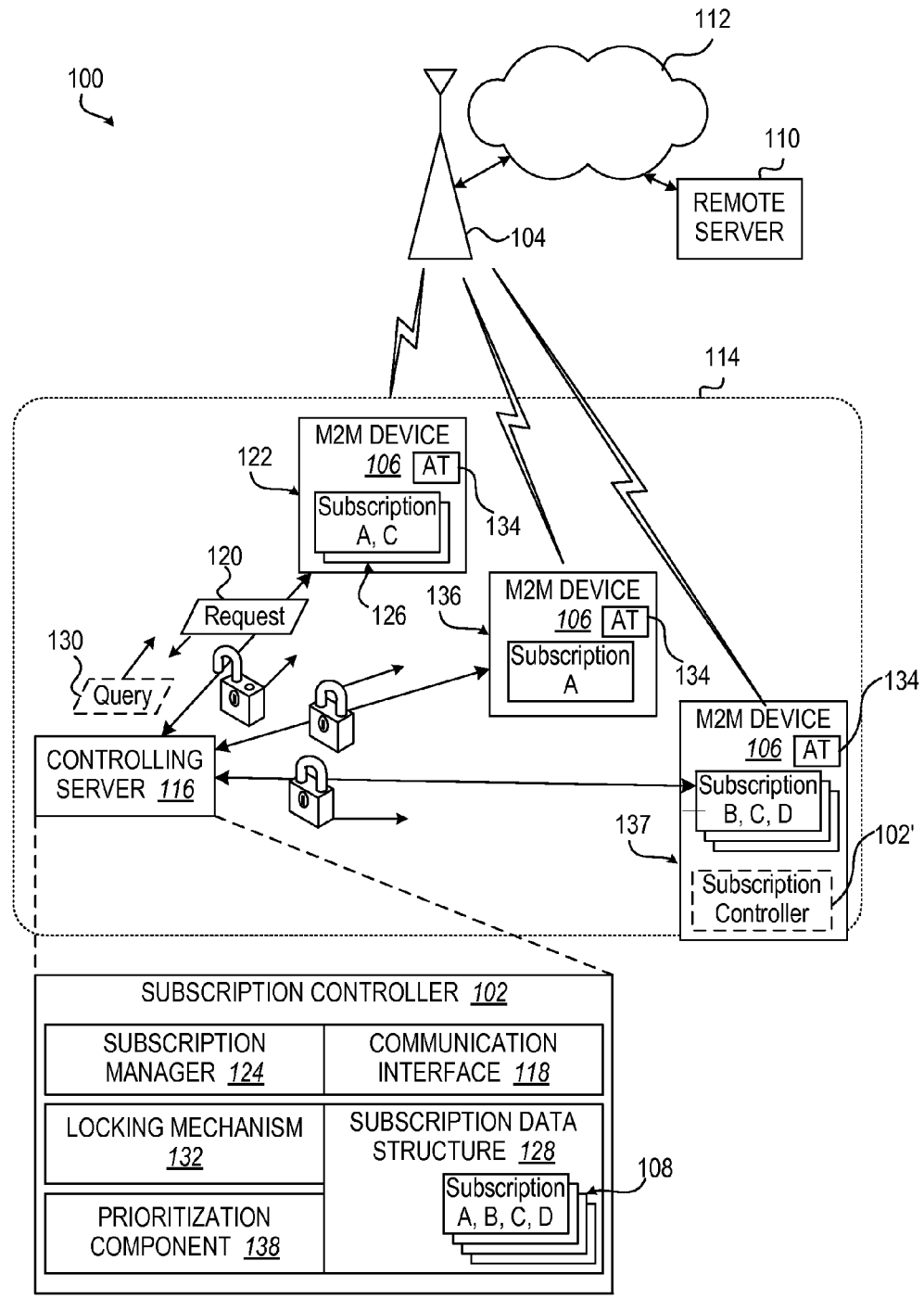
FIG. 1 is a schematic block diagram of a communication system wherein a subscriber controller manages subscriptions used by a plurality of devices, according to one aspect.

In FIG. 1, in a communication system 100, an apparatus depicted as a subscription controller 102 manages access to a subscriber-based network, depicted as a cellular network 104, by a plurality of machine-to-machine (M2M) devices 106. It should be appreciated that subscriptions can be required for accessing a network entity removed from an access network (e.g., a cellular network 104). For example, an end user can be entitled to a certain capacity of resources for reporting or retrieving data that is controlled by use of a set number of subscriptions 108 to a remote server 110 on a core network 112. In order to make better use of the set number of subscriptions across a greater number of M2M devices 106, the subscription controller 102 can manage the subscriptions 108.

The subscription controller 102 and M2M devices 106 share a common resource, depicted as a wireless or wired home network 114. For instance, it should be appreciated that the subscription controller 102 can be one of the M2M devices 106 that is designated as the subscription controller 102 of an ad hoc home network. Alternatively, the subscription controller 102 can be a component of a subscription Controlling Server (CS) 116.

A communication interface 118 of the subscription controller 102 receives a request 120 for a data connection by a first device 122 of the plurality of M2M devices 106. A subscription manager 124 responds by determining a first subset 126 of a plurality of subscriptions 108 that are provisioned on the first device 122. For instance, the communication interface 118 can originally have provisioned the first device 122 with the first subset 126 of subscriptions 108 and the subscription manager 124 can maintain a subscription data structure 128 (e.g., table, database, file, etc.) for later access. Moreover, the subscription controller 102 can distribute respective subsets of the subscriptions to each of the plurality of M2M devices 106 for optimizing access. Alternatively, the first device 122 can report the first subset 126 of the subscriptions 108 contemporaneously to the subscription controller 102, such as dynamically in response to a query 130 or as part of the request.

It should be appreciated that the request 120 for a data connection can arise when the subscription controller 102 wakes up the first device 122 when a time interval or other need is determined for the data connection.

The subscription manager 124 determines whether a selected subscription of the first subset 126 of the subscriptions is not being used by any of the other M2M devices 106. Assuming that one is found, the subscription manager 124 enables the first device 122 to use the selected subscription. In particular, the subscription manager 124 updates a locking mechanism 132 that prevents other M2M devices 106 from using the selected subscription. The first device 122 can thus communicate via an Access Terminal (AT) 134 to the cellular network 104.

Instances can arise wherein all of the subscriptions available to a second device 136 of the plurality of M2M devices 106 are in use, and thus the locking mechanism 132 can prevent their use by locking these subscriptions. It may be impractical or inefficient to provide a large number of subscriptions to each M2M device 106 to prevent this occurrence. For example, to overcome contention issues, the first device 122 can be deemed to be a lower priority or to have excessively monopolized use of a subscription, thereby allowing use of the subscription by a second device 136 of the M2M devices 106. To that end, the subscription controller 102 can utilize a prioritization component 138 that rank orders M2M devices, usage of subscriptions 108 by M2M devices 106, etc., in order to optimize distribution of subscriptions 108 or to force relinquishment of a data connection of certain ones of the subscriptions 108.

In implementations consistent with the present implementation, optionally, one or more networked devices can negotiate amongst themselves or have a procedure for assuming the role of the subscription controller, depicted for a third one 137 of the M2M devices 106 at 102'.

Figure 2:
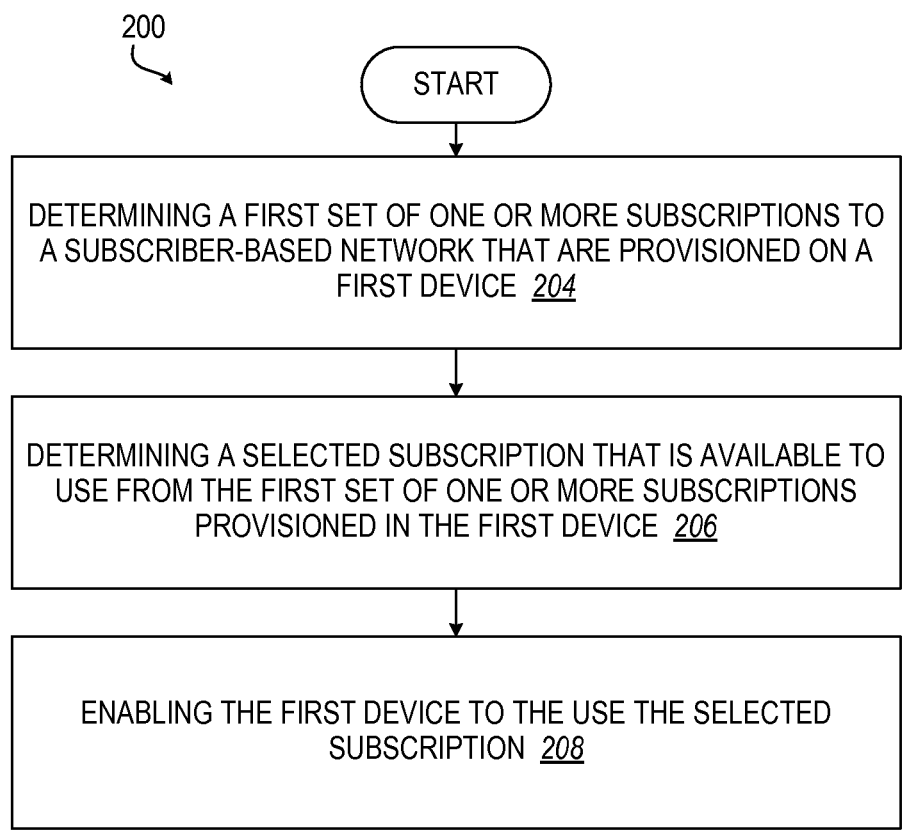
FIG. 2 is a flow diagram of a method for managing access to a subscriber-based network by a plurality of Machine-to-Machine (M2M) devices, according to one aspect.

In FIG. 2, a method 200 is depicted for a subscription controller that manages access to a subscriber-based network by a plurality of M2M devices communicated with via a communication component. The method includes determining a first set of one or more subscriptions to a subscriber-based network that are provisioned on a first device (block 204). The method also includes determining a selected subscription that is available to use from the first set of one or more subscriptions provisioned in the first device (block 206). Additionally, the includes enabling the first device to use the selected subscription (block 208).

In one aspect, determining the selected subscription further comprises determining that the selected subscription is being used by a second device, and causing the second device to relinquish the selected subscription. In an exemplary aspect, causing the second device to relinquish the selected subscription further comprises requesting the second device to relinquish the selected subscription, receiving confirmation that the subscription is no longer being used by the second device, and unlocking the selected subscription to make the selected subscription available to the first device.

In another aspect, determining the selected subscription from the first set further comprises locking the selected subscription to the first device so that no other device can use the selected subscription until unlocked by the first device.

In an additional aspect, determining the first set of one or more subscriptions further comprises querying the first device for the first set of one or more subscriptions it wishes to consider.

In a further aspect, determining the first set of one or more subscriptions is in response to receiving a request for a data connection from the first device. In an exemplary aspect, receiving the request for the data connection from the first device further comprises receiving identification of the first set from the first device.

In yet another aspect, determining the first set of one or more subscriptions further comprises storing a data structure that tracks provisioning of the first set of one or more subscriptions on the first device. In an exemplary aspect, receiving a notification at a controlling server from the first device occurs when a subscription is provisioned on the first device. In another exemplary aspect, receiving a notification at a controlling server from the first device occurs when a subscription is removed from the first device.

In yet a further aspect, the method further provides for determining that the first device has relinquished the data connection, and unlocking use of the selected subscription.

In another aspect, the method further provides for determining a second set of one or more subscriptions to the subscriber-based network that are provisioned on a second device, and preventing the first device and the second device from both simultaneously using the selected subscription. In an exemplary aspect, preventing both from simultaneously using the selected subscription is by determining that the second device has a need to use the selected subscription in use by the first device, prioritizing use of the selected subscription, and causing the first device to relinquish the selected subscription in response to the prioritizing.

In an additional aspect, determining the selected subscription that is available to use further comprises communicating, by a subscription controller, over a local network to a plurality of locally-networked devices comprising the first device. In an exemplary aspect, the method further provides negotiating between more than one of the plurality of locally-networked devices to select one device for acting as a subscription manager.

In a further aspect, the method further provides communicating with the subscriber-based network to provision the first device with the selected subscription.

Figure 3:
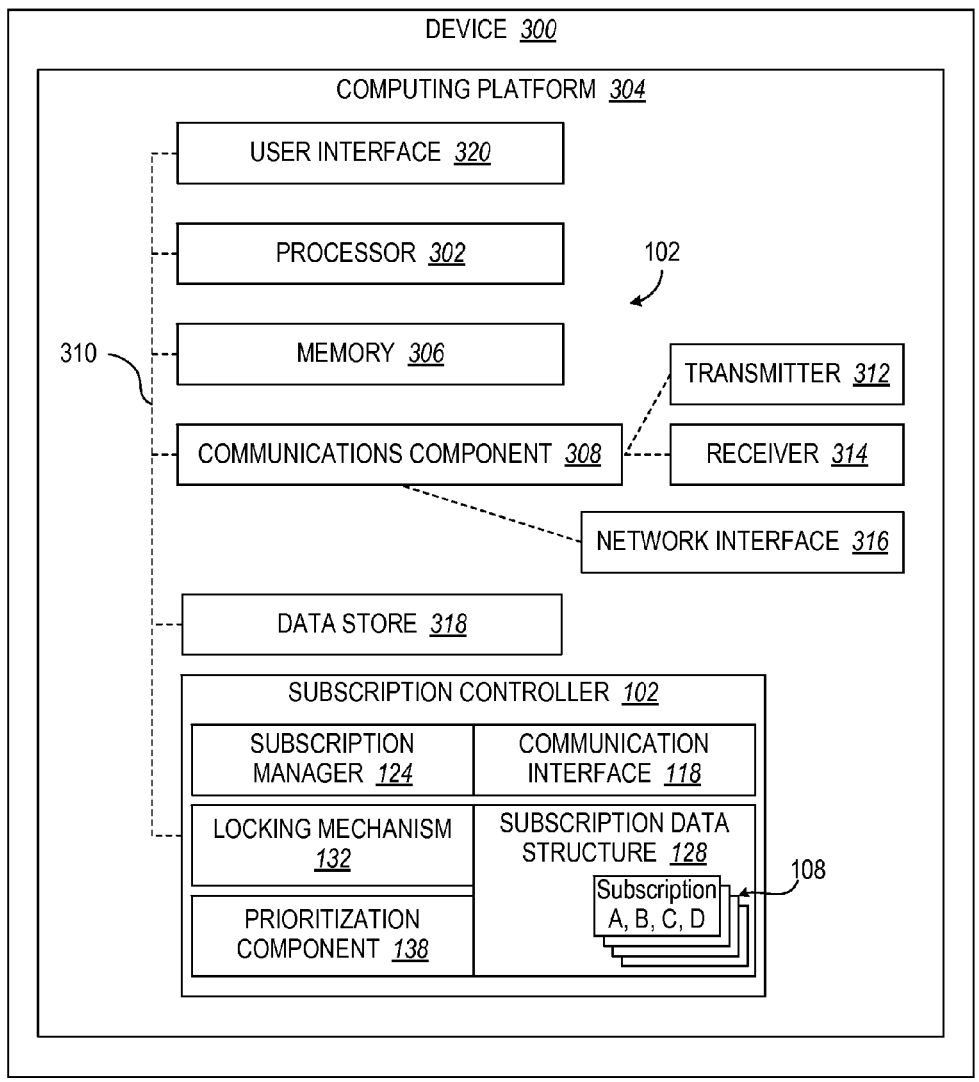
FIG. 3 is a schematic block diagram of an exemplary hardware environment for a device acting as the subscription manager, according to one aspect.

Referring to FIG. 3, in one aspect, a device 300 that can act as an M2M device 106 (FIG. 1) or controlling server (CS) 116 (FIG. 1) may include a processor 302 for carrying out processing functions associated with one or more of components and functions described herein. Processor 302 can include a single or multiple set of processors or multi-core processors as part. Moreover, processor 302 can be implemented as an integrated processing system and/or a distributed processing system, depicted as a computing platform 304.

Device 300 further includes a memory 306, such as for storing local versions of applications being executed by processor 302. Memory 306 can include any type of memory usable by a computer, such as random access memory (RAM), read only memory (ROM), tapes, magnetic discs, optical discs, volatile memory, non-volatile memory, and any combination thereof.

Further, device 300 includes a communications component 308 that provides for establishing and maintaining communications with one or more parties utilizing hardware, software, and services as described herein. Communications component 308 may carry communications between components on device 300, as well as between device 300 and external devices, such as devices located across a communications network and/or devices serially or locally connected to device 300. For example, communications component 308 may include one or more buses 310, and may further include transmit chain components and receive chain components associated with a transmitter 312 and a receiver 314, respectively, operable for interfacing with external devices. For another example, communications component 308 may communicate to external devices via a network interface 316.

Additionally, device 300 may further include a data store 318, which can be any suitable combination of hardware and/or software, that provides for mass storage of information, databases, and programs employed in connection with aspects described herein. For example, data store 318 may be a data repository for applications not currently being executed by processor 302.

Device 300 may additionally include a user interface 320 operable to receive inputs from a user of device 300 and further operable to generate outputs for presentation to the user. User interface 320 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 320 may include one or more output devices, including but not limited to a display, a speaker, a haptic feedback mechanism, a printer, any other mechanism capable of presenting an output to a user, or any combination thereof.

Resident in memory 306, data store 318 or both, aspects of the device 300 can incorporate the subscription controller 102, such as the subscription manager 124, locking mechanism 132, prioritization component 138, communication interface 118, and subscription data structure 128.

Figure 4:
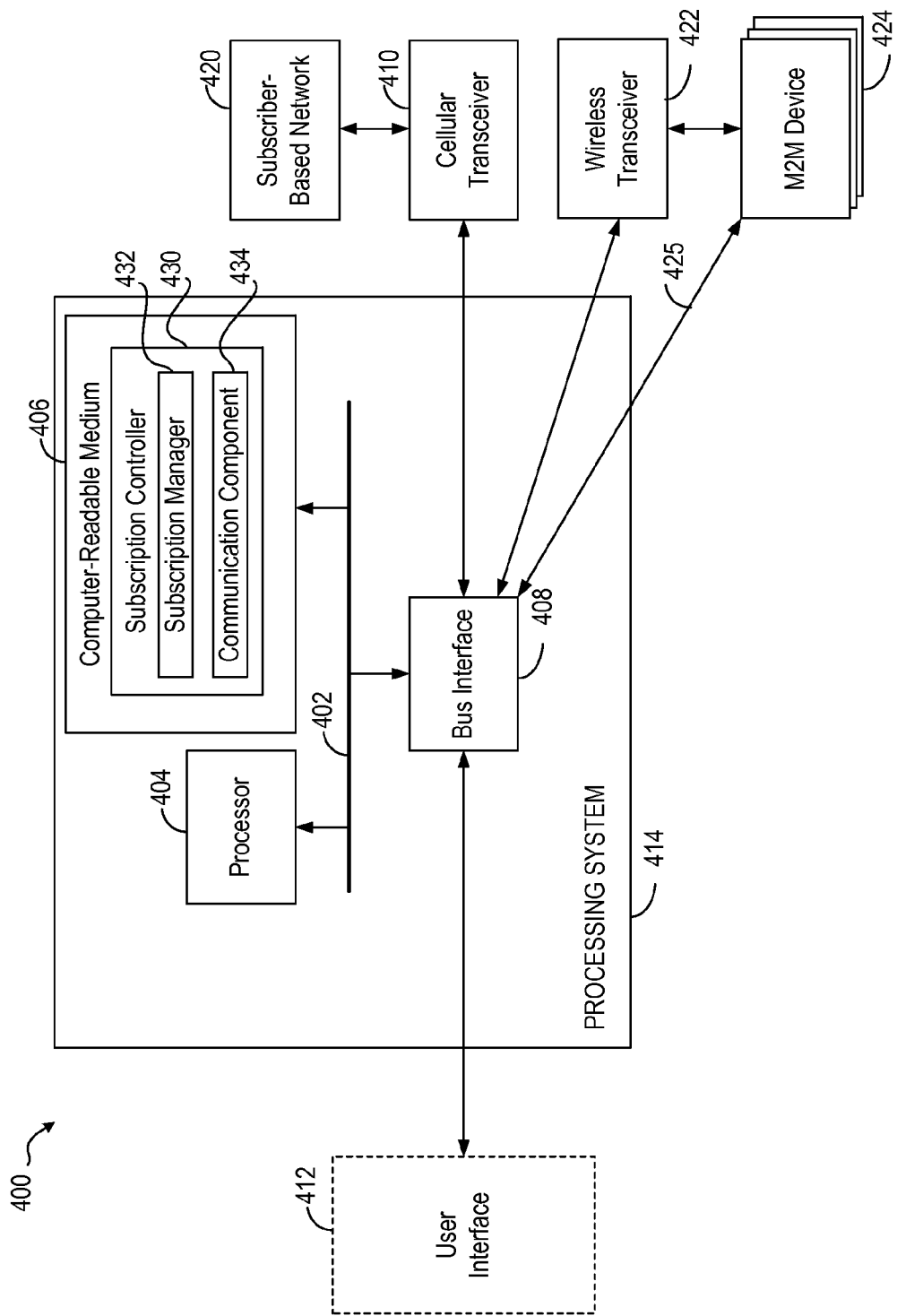
FIG. 4 is a conceptual block diagram of an exemplary hardware environment for a subscription controller for managing access to a subscriber-based network by a plurality of M2M devices, according to one aspect.

FIG. 4 is a conceptual diagram illustrating an example of a hardware implementation for an apparatus 400 employing a processing system 414 that manages access to a subscriber-based network by a plurality of devices. In this example, the processing system 414 may be implemented with bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, and computer-readable media, represented generally by the computer-readable medium 406. The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatuses over a transmission medium. Depending upon the nature of the apparatus, a user interface 412 (e.g., keypad, display, speaker, microphone, joystick) may also be provided.

In an exemplary aspect, the transceiver 410 is for communicating with a subscriber-based network (e.g., cellular network) 420. A transceiver 422 can also be provided for wirelessly communicating with M2M devices 424. A wired network 425 could also be used at least in part for communication between M2M devices 424 and the apparatus 400.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software. In an exemplary aspect, a subscription controller 430 for that is resident in computer-readable medium 406 and executed by the processor 404 manages access to a subscriber-based network by a plurality of M2M devices. In an exemplary aspect, the subscription controller 430 can further comprise a subscription manager 432 and communication component 434.

Alternatively, components and functionality for interaction with a user can be omitted from a deployed portion of the apparatus 400, such as a M2M device.

Figure 5:
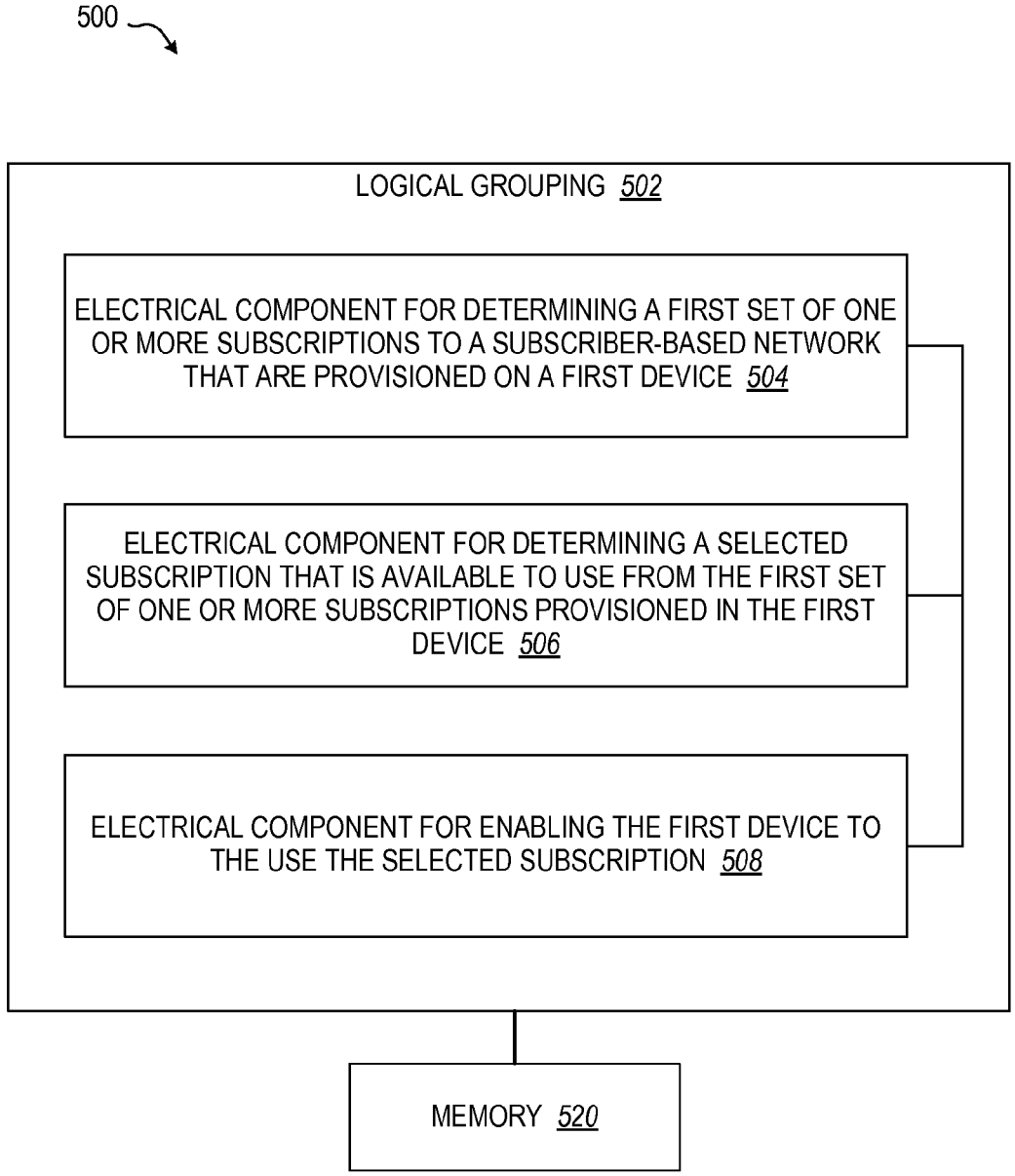
FIG. 5 is a system of logical groupings of electrical components for managing access to a subscriber-based network by a plurality of M2M devices.

With reference to FIG. 5, illustrated is a system 500 for managing access to a subscriber-based network by a plurality of M2M devices. For example, system 500 can reside at least partially within user equipment. It is to be appreciated that system 500 is represented as including functional blocks, which can be functional blocks that represent functions implemented by a computing platform, processor, software, or combination thereof (e.g., firmware). System 500 includes a logical grouping 502 of electrical components that can act in conjunction. For instance, logical grouping 502 can include an electrical component 504 for determining a first set of one or more subscriptions to a subscriber-based network that are provisioned on a first device. For another instance, logical grouping 502 can include an electrical component 506 for determining a selected subscription that is available to use from the first set of one or more subscriptions provisioned in the first device. For an additional instance, logical grouping 502 can include an electrical component 508 for enabling the first device to the use the selected subscription. Additionally, system 500 can include a memory 520 that retains instructions for executing functions associated with electrical components 504-508. While shown as being external to memory 520, it is to be understood that one or more of electrical components 504-508 can exist within memory 520.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product. In one aspect, a M2M device can have single slot, dual slot, or multiple slots for provisioning the Subscriber Identity Module (SIM), Removable User Identity Module (RUIM), etc. The M2M device can also support multiple modems and multiple transceivers to have multiple subscriptions active on one single M2M device.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), Asymmetric Digital Subscriber Line (ADSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for managing access to a subscriber-based network by a plurality of machine-to-machine (M2M) devices, comprising:
   determining a first set of one or more subscriptions to a subscriber-based network that were previously provisioned, and are available, to a first device, wherein the first set of one or more subscriptions remains associated with the first device;
   determining a selected subscription that is available to use from the first set of one or more subscriptions previously provisioned to the first device; and
   enabling the first device to use the selected subscription, wherein determining the first set of one or more subscriptions further comprises storing a data structure that tracks provisioning of the first set of one or more subscriptions on the first device, further comprising receiving a notification at a controlling server from the first device when a subscription is provisioned on the first device.

2. The method of claim 1, wherein determining the selected subscription further comprises:
   determining that the selected subscription is being used by a second device; and
   causing the second device to relinquish the selected subscription.

3. The method of claim 2, wherein causing the second device to relinquish the selected subscription further comprises:
   requesting the second device to relinquish the selected subscription;

receiving confirmation that the selected subscription is no longer being used by the second device; and unlocking the selected subscription to make the selected subscription available to the first device.

4. The method of claim 1, wherein determining the selected subscription from the first set further comprises locking the selected subscription to the first device so that no other device can use the selected subscription until unlocked.

5. The method of claim 1, wherein determining the first set of one or more subscriptions further comprises querying the first device for the first set of one or more subscriptions.

6. The method of claim 1, wherein determining the first set of one or more subscriptions is in response to receiving a request for a data connection from the first device.

7. The method of claim 6, wherein receiving the request for the data connection from the first device further comprises receiving identification of the first set from the first device.

8. The method of claim 1 further comprising:
determining that the first device has relinquished a data connection; and
unlocking use of the selected subscription.

9. The method of claim 1, further comprising:
determining a second set of one or more subscriptions to the subscriber-based network that were previously provisioned, and are available, to a second device, wherein
the second set of one or more subscriptions remains associated with the second device, and
the second set of one or more subscriptions may include one or more of the subscriptions included in the first set of one or more subscriptions; and
preventing the first device and the second device from both simultaneously using the selected subscription.

10. The method of claim 9, further comprising:
determining that the second device has a need to use the selected subscription in use by the first device;
prioritizing use of the selected subscription; and
causing the first device to relinquish the selected subscription in response to the prioritizing.

11. The method of claim 1, further comprising communicating with the subscriber-based network to provision the first device with the selected subscription.

12. A method for managing access to a subscriber-based network by a plurality of machine-to-machine (M2M) devices, comprising:
determining a first set of one or more subscriptions to a subscriber-based network that were previously provisioned, and are available, to a first device, wherein the first set of one or more subscriptions remains associated with the first device;
determining a selected subscription that is available to use from the first set of one or more subscriptions previously provisioned to the first device; and
enabling the first device to use the selected subscription, wherein determining the first set of one or more subscriptions further comprises storing a data structure that tracks provisioning of the first set of one or more subscriptions on the first device, further comprising receiving a notification at a controlling server from the first device when a subscription is removed from the first device.

13. A method for managing access to a subscriber-based network by a plurality of machine-to-machine (M2M) devices, comprising:
determining a first set of one or more subscriptions to a subscriber-based network that were previously provisioned, and are available, to a first device, wherein the first set of one or more subscriptions remains associated with the first device;
determining a selected subscription that is available to use from the first set of one or more subscriptions previously provisioned to the first device; and
enabling the first device to use the selected subscription wherein determining the selected subscription that is available to use further comprises communicating, by a subscription controller, over a local network to a plurality of locally-networked devices comprising the first device, further comprising negotiating between more than one of the plurality of locally-networked devices to select one device for acting as a subscription manager.

14. An apparatus for managing access to a subscriber-based network by a plurality of machine-to-machine (M2M) devices, comprising:
a communication component that communicates with a first device; and
a subscription manager coupled to the communication component, the subscription manager for determining a first set of one or more subscriptions to a subscriber-based network that were previously provisioned, and are available, to a first device, determining a selected subscription that is available to use from the first set of one or more subscriptions previously provisioned to the first device, and enabling the first device to the use the selected subscription, wherein the subscription manager is further for determining the first set of one or more subscriptions by storing a data structure that tracks provisioning of the first set of one or more subscriptions on the first device, further comprising the communication component is further for receiving a notification at a controlling server from the first device when a subscription is provisioned on the first device.

15. An apparatus for managing access to a subscriber-based network by a plurality of machine-to-machine (M2M) devices, comprising:
a communication component that communicates with a first device; and
a subscription manager coupled to the communication component, the subscription manager for determining a first set of one or more subscriptions to a subscriber-based network that were previously provisioned, and are available, to a first device, determining a selected subscription that is available to use from the first set of one or more subscriptions previously provisioned to the first device, and enabling the first device to the use the selected subscription, wherein the subscription manager is further for determining the first set of one or more subscriptions by storing a data structure that tracks provisioning of the first set of one or more subscriptions on the first device, further comprising the communication component is further for receiving a notification at a controlling server from the first device when a subscription is removed from the first device.

16. An apparatus for managing access to a subscriber-based network by a plurality of machine-to-machine (M2M) devices, comprising:
a communication component that communicates with a first device; and
a subscription manager coupled to the communication component, the subscription manager for determining a first set of one or more subscriptions to a subscriber-based network that were previously provisioned, and are available, to a first device, determining a selected subscription that is available to use from the first set of one or more subscriptions previously provisioned to the first device, and enabling the first device to the use the selected subscription, wherein the communication component is further for communicating over a local network to a plurality of locally-networked devices comprising the first device, wherein the communication component is further for negotiating between more than one of the plurality of locally-networked devices to select one device for acting as the subscription manager.

17. A method for managing access to a subscriber-based network by a plurality of machine-to-machine (M2M) devices, comprising:
- determining a first set of one or more subscriptions to a subscriber-based network that are provisioned on a first device, wherein determining the first set of one or more subscriptions further comprises storing a data structure that tracks provisioning of the first set of one or more subscriptions on the first device;
- determining a selected subscription that is available to use from the first set of one or more subscriptions provisioned in the first device;
- enabling the first device to use the selected subscription; and
- receiving a notification at a controlling server from the first device when a subscription is provisioned on the first device.

18. A method for managing access to a subscriber-based network by a plurality of machine-to-machine (M2M) devices, comprising:
- determining a first set of one or more subscriptions to a subscriber-based network that are provisioned on a first device, wherein determining the first set of one or more subscriptions further comprises storing a data structure that tracks provisioning of the first set of one or more subscriptions on the first device;
- determining a selected subscription that is available to use from the first set of one or more subscriptions provisioned in the first device;
- enabling the first device to use the selected subscription; and
- receiving a notification at a controlling server from the first device when a subscription is removed from the first device.

19. A method for managing access to a subscriber-based network by a plurality of machine-to-machine (M2M) devices, comprising:
- determining a first set of one or more subscriptions to a subscriber-based network that are provisioned on a first device;
- determining a selected subscription that is available to use from the first set of one or more subscriptions provisioned in the first device, wherein determining the selected subscription that is available to use further comprises communicating, by a subscription controller, over a local network to a plurality of locally-networked devices comprising the first device;
- enabling the first device to use the selected subscription; and
- negotiating between more than one of the plurality of locally-networked devices to select one device for acting as a subscription manager.

20. An apparatus for managing access to a subscriber-based network by a plurality of machine-to-machine (M2M) devices, comprising:
- a communication component that communicates with a first device; and
- a subscription manager coupled to the communication component, the subscription manager for determining a first set of one or more subscriptions to a subscriber-based network that are provisioned on a first device by storing a data structure that tracks provisioning of the first set of one or more subscriptions on the first device, determining a selected subscription that is available to use from the first set of one or more subscriptions provisioned in the first device, and enabling the first device to the use the selected subscription,
- wherein the communication component is for receiving a notification at a controlling server from the first device when a subscription is provisioned on the first device.

21. An apparatus for managing access to a subscriber-based network by a plurality of machine-to-machine (M2M) devices, comprising:
- a communication component that communicates with a first device; and
- a subscription manager coupled to the communication component, the subscription manager for determining a first set of one or more subscriptions to a subscriber-based network that are provisioned on a first device by storing a data structure that tracks provisioning of the first set of one or more subscriptions on the first device, determining a selected subscription that is available to use from the first set of one or more subscriptions provisioned in the first device, and enabling the first device to the use the selected subscription,
- wherein the communication component is for receiving a notification at a controlling server from the first device when a subscription is removed from the first device.

22. An apparatus for managing access to a subscriber-based network by a plurality of machine-to-machine (M2M) devices, comprising:
- a communication component that communicates with a first device; and
- a subscription manager coupled to the communication component, the subscription manager for determining a first set of one or more subscriptions to a subscriber-based network that are provisioned on a first device, determining a selected subscription that is available to use from the first set of one or more subscriptions provisioned in the first device, and enabling the first device to the use the selected subscription, wherein
- the communication component is for
- communicating over a local network to a plurality of locally-networked devices comprising the first device, and
- negotiating between more than one of the plurality of locally-networked devices to select one device for acting as the subscription manager.

* * * * *